United States Patent [19]

Jones

[11] Patent Number: 4,821,653

[45] Date of Patent: Apr. 18, 1989

[54] PROCESS AND APPARATUS FOR FIXING, ENCAPSULATING, STABILIZING AND DETOXIFYING HEAVY METALS AND THE LIKE IN METAL-CONTAINING SLUDGES, SOILS, ASH AND SIMILAR MATERIALS

[76] Inventor: Bradford H. Jones, 85 Portsmouth Ave., P.O. Box 219, Stratham, N.H. 03885

[21] Appl. No.: 238,606

[22] Filed: Aug. 30, 1988

Related U.S. Application Data

[62] Division of Ser. No. 831,409, Feb. 20, 1986, Pat. No. 4,781,944.

[51] Int. Cl.⁴ ............................................. F23G 5/12
[52] U.S. Cl. ................................. 110/229; 110/210; 110/224; 110/238; 110/259; 427/228
[58] Field of Search ............... 427/228; 8/94; 110/229, 110/238, 236, 242, 210, 259, 224

[56] References Cited

U.S. PATENT DOCUMENTS

| | | |
|---|---|---|
| 4,086,319 | 4/1978 | Jones ................................. 423/53 |
| 4,108,677 | 8/1978 | Valigg ............................... 405/129 |
| 4,142,912 | 3/1979 | Young ............................... 405/129 |
| 4,152,470 | 5/1979 | Steinegger ......................... 427/228 |
| 4,215,989 | 7/1980 | Cartier ................................... 8/94 |
| 4,332,584 | 11/1982 | Muralidhara ........................... 8/94 |
| 4,732,092 | 3/1988 | Gould ................................. 110/229 |
| 4,751,887 | 6/1988 | Terry et al. ....................... 110/246 |
| 4,759,300 | 7/1988 | Hansen et al. .................... 110/229 |

Primary Examiner—Edward G. Favors
Attorney, Agent, or Firm—Rines and Rines, Shapiro and Shapiro

[57] ABSTRACT

Heavy metals and compounds thereof and other toxic materials in industrial wastes, sludges, soils, incinerated ashes and the like are fixed and stabilized in a char residue, obtained by critical region pyrolyzing techniques and appropriate proportions of carbonaceous materials intimately mixed with the sludge, to encapsulate the heavy metals with carbon bonded thereto which effectively detoxifies the residue and renders it immune to any substantial leaching out or later exposure to the toxic metals, such that the same is environmentally safe for such uses as landfill and the like.

4 Claims, 5 Drawing Sheets

PROCESS AND APPARATUS FOR FIXING, ENCAPSULATING, STABILIZING AND DETOXIFYING HEAVY METALS AND THE LIKE IN METAL-CONTAINING SLUDGES, SOILS, ASH AND SIMILAR MATERIALS

This is a divisional patent application of U.S. Ser. No. 831,409, filed Feb. 20, 1986. U.S. Pat. No. 4,781,944.

The present invention relates to processes and apparatus for detoxifying heavy metals and the like contained in sludges, soils, incinerated ashes and similar materials; being more particularly directed to novel techniques for effecting the encapsulation, fixing and stabilizing of such residues to render them safe (by at least Environmental Protection Agency (EPA) standards) from the leaching out of, or later exposure to, heavy metal products therein, such that the residues may be directly used in landfills and other applications, if desired.

Previous approaches to the solution of the above problem have been made through the use of chemical fixation and stabilization techniques, including the combining of silicates and Portland Cement to produce a stabilized, solidified material. While such processes have some effectiveness in binding heavy metals, the effectiveness in stabilizing volatile organics is questionable, and the solidification process unfortunately requires increasing the volume of the sludge by ten to twenty percent. The solidified product is landfilled or may be used for landfill cover material but, as compared with the later-described fixed product of the present invention, is at least twice as expensive, with the invention providing most advantageously for about eighty seven percent less weight and seventy percent less volume in some tests.

In accordance with the techniques employed to attain the results of the present invention, a pyrolysis step is employed that of itself has been used in prior systems that are and have as their objectives the antithesis of the current invention; that is, the deliberate recovery of the heavy metal from the end product. One such is described, for example, in U.S. Pat. No. 4,332,584 where the resulting carbon and heavy metal residue can be centifuged to recover chromium, for example, and the chromium may be readily leached out by dissolving in sulfuric acid solution. Other metal recovery techniques, as distinguished from metal fixing techniques, are disclosed in my prior U.S. Pat. No. 4,086,319 and in U.S. Pat. No. 4,215,989.

Examples of materials with which the fixing, stabilizing and thus effective detoxifyzing of heavy metals and the like of the invention may be employed include sludges, wastes such as tannery waste with its high chromium content, soils, ash materials and the like (often hereinafter generically referred to as "sludges"); and typical heavy metals or metal compounds (often hereinafter generically referred to as "metals") include chromium, arsenic, barium, cadmium, lead, mercury, selenium, silver, nickel, zinc, copper and others.

In accordance with the present invention, unlike prior pyrolysis systems, it has been discovered that the chrome or other heavy metal sludge, tannery wastes or other heavy metal-containing solutions and the like may be treated in such a manner that the heavy metals are effectively non-leachable and cannot be recovered; and, indeed, are fixed and encapsulated with carbon-bonded coatings that enable the residue to be safely used for landfill and other uses without fear of ultimate leaching out of, or other later exposure to, the heavy metals from the end product. While the step of pyrolysis or heating of the sludge or tannery waste or the like, in a substantially oxygen-free atmosphere, is a step common to other processes and the present invention, thus, the way in which this step is utilized and subsequent steps are performed is uniquely designed to obtain the very different and indeed opposite result of a heavy metal-fixed char residue that is safe to the environment and from which the heavy metals cannot effectively be leached out.

An object of the present invention, accordingly, is to provide a new and improved process and apparatus for fixing, stabilizing and effectively detoxifying heavy metals in a metal-containing sludge, soil, ash or the like that is not subject to the above-described disadvantages of prior chemical fixing and other techniques, but provides vastly improved, less costly and more efficacious stabilizing not only of the resulting residue but of the volatile organics and solvents driven off in the process, as well.

A further object is to provide such a new process in which a novel intimate carbon-coating is bonded to or encapsulated with heavy metal residues to render the same permanently substantially non-leachable.

Other and further objects will be explained hereinafter and are more particularly delineated in the appended claims.

In summary, however, the invention involves a volume reduction process that thermally stabilizes the heavy metals and volatilizes organic compounds. The resulting residue often has fifty to eighty percent less volume than the original sludge or composite feed. The process operates in a starved air combustion unit capable of controlling temperature and residence time; and resulting residue contains an acid-insoluble matrix. This process produces about fifty percent more residue that incineration, but admirably passes EPA's Extraction Procedure Tests for leaching, heavy metals, and is therefore well-suited for landfill disposal. Heavy metals and other potentially toxic compounds are stabilized, moreover, at temperatures below their volatilization temperature, along with an intimate mixture of organic compounds. The thermal residence time is controlled to produce minimum volume without significant decarbonization (the latter being causable by excess oxygen). Toxic, volatile off-gas and odors are destroyed within a high temperature afterburner designed for apppropriate (two-second minimum) contact time.

This process, as later discussed, has been tested effectively on sewage treatment plant sludges, among other materials, containing potentially toxic concentrations of chromium, lead, cadmium, barium, nickel, zinc and other toxic heavy metals, with the resulting residues tested using both the EPA Leaching Test employing acetic acid to acidify the residue to a pH of 5, and the well-known Multiple Extraction (ME) Test that utilizes a subsequent sulfuric and nitric acid mixture to acidify the residue to a pH of 4.

While sludge incinerators and trash incinerations often produce ash residues containing toxic, leachable metal oxides and dioxin, the residue produced with the process of the present invention does not contain significantly soluble metal oxides (e.g., chromium), as later tabulated. The residue, furthermore, can be mixed at ten to fifteen percent, for example, of Portland Cement (on a weight basis), if desired, with a quantity of water equal to the weight of the residue, and some coarse sand. The resulting cemented residue materal has a specific gravity of about one, it is fireproof, and it has sufficient structural strength to be safely used for lightweight building products.

Another illustrative application of the invention is for stabilizing toxic metals within waste sludges from steel drum reconditionig plants, the empty drums containing a variety of residual materials which often contain toxic metallic and organic compounds. The resulting residues show a 50-percent reduction in volume with the toxic metals immobilized with carbon, and the solvents destroyed in the afterburner. The invention can also be used to process toxic waste and eliminate the need of disposing of these materials in hazardous waste landfills; with the residue used for landfill or solidified for use in building products such as cinder blocks, asphalt, concrete or other lightweight products, as before suggested.

As still another use, the invention may aid in the recovery of chromium from the leather and metal plating industries since the char residue passes the EPA Extraction Procedure, indicating that the residue will not leach excessive quantities of chromium. Subsequent roasting of such residues containing chromium produces a chromate ash from which chromium can be extracted, as in some of the above-cited patents, with the remaining insoluble residues treated by the invention to produce a non-toxic residue.

When a carbon source is mixed with an ash containing toxic chromium, as still another example, the process of the invention involving starved air conditions, results in a residue that cannot leach any significant levels of chromium, such that the invention allows toxic ash to be effectively detoxified, as well.

Summarizing the technique underlying the invention, from one of its important aspects, the same embodies a process for fixing and stabilizing heavy metals in a metal-containing sludge, soil, ash material and the like, that comprises, heating the sludge with intimately contacting carbon-containing material to a temperature sufficient to drive off volatile organics and solvents, but below the volatilization temperature of a heavy metals and the oxides of nitrogen and sulfur, and in a substantially oxygen-free environment; continuing the heating to the point where a resulting char residue develops with carbon bonded to the metal as a coating thereabout and from which substantially all volatile organics and solvents are driven off, as indicated by substantially reaching the minimum residue weight; cooling the char residue in the absence of air to a temperature at which it will no longer combust if exposed to air; thereafter cooling further to ambient temperature to provide a non-leachable residue; and using the same for landfill and the like. Preferred process steps and best mode details and apparatus are hereinafter presented.

The invention will now be described with reference to the accompanying drawings, FIG. 1 of which is an apparatus and flow diagram illustrating the process and apparatus of the invention applied to the use of organic feed materials (such as sludge, soils, hazardous waste, incinerator ash and organic mixtures) as the fuel;

Figure 1:
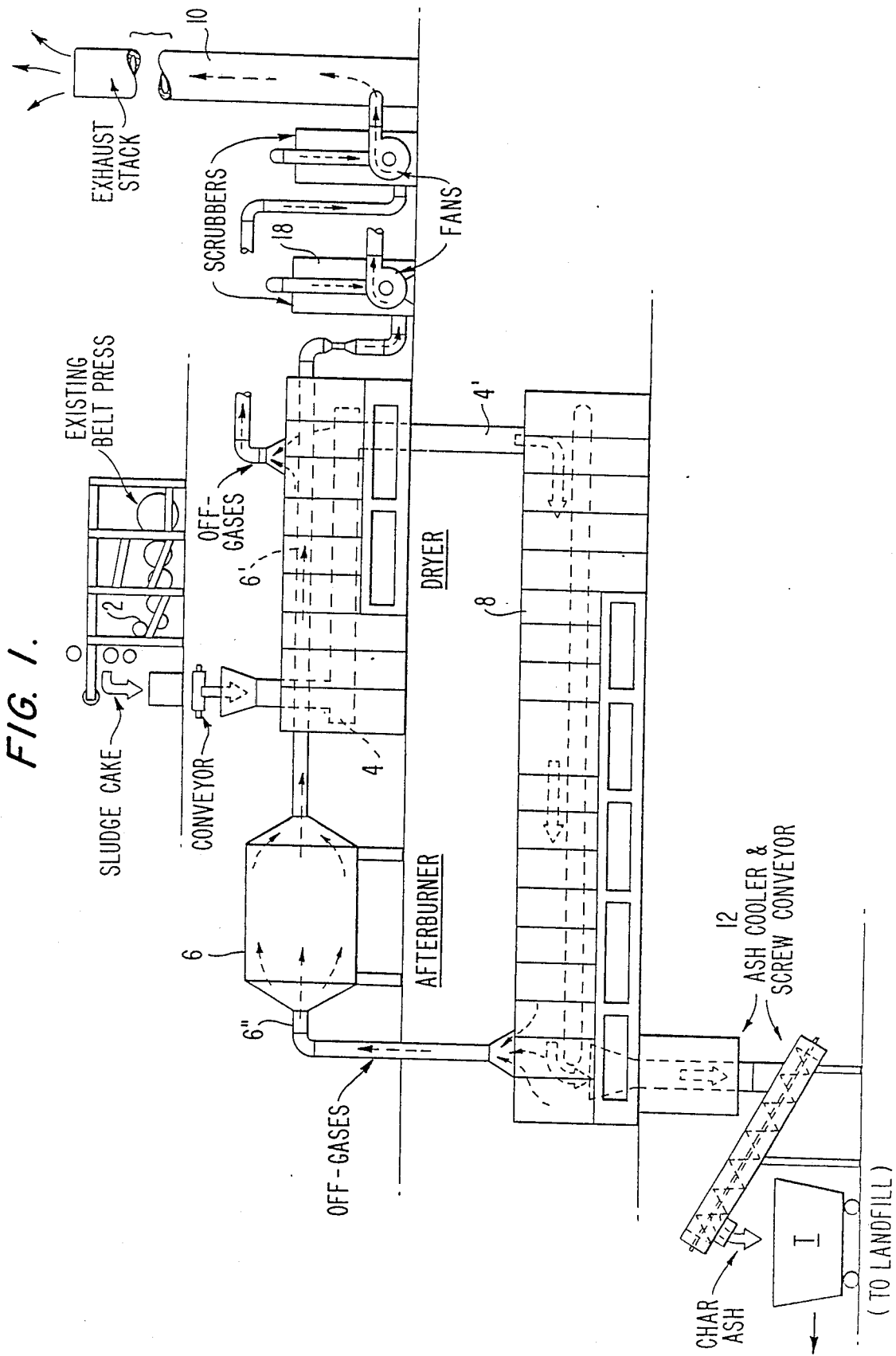

Referring to FIG. 1, an apparatus for practicing the process of the invention as applied to the detoxifying (by fixing and stabilizing as before described) of industrial waste sludges including chromium as from tannery waste and the like, is illustrated.

Sludge containing toxic heavy metals and volatiles is de-watered on a belt press 2, and is conveyed to a tumble dryer 4 (as of the Tumbler Dryer Type of Bartlett Snow Pacific Co., for example). This dries the feed material from the one-third solids coming from the sludge belt press 2 to approximately 65% solids, utilizing waste heat generated by the afterburner 6, to be described later. The feed material dried to 65% solids then enters at chute 4' (by gravity) into a pyrolysis unit 8, the size of which can be reduced because of the effect of weight reduction caused by the at least partial drying or pre-drying operation. The unit 8 provides a largely airtight oxygen-free combustion furnace environment for pyrolysis at temperatures, in this particular case, of around 900 degrees Fahrenheit, below the volatilization temperature of most heavy metals before mentioned (and, also, while inhibiting the formation of oxides of nitrogen and sulfur as well, to avoid their presence) but sufficient to drive off the volatile organics and solvents as off-gases, later described. The critical conditions of operation for attaining the fixings of the invention by carbon-bonding or encapsulating, will later be described; a suitable pyrolysis unit adjustable for such purposes being, for example, that of Shirco Infrared Company of Dallas, Tex.

The before-mentioned afterburner 6 (also, for example, of the Shirco Type) further oxidizes and volatilizes the off-gases and volatiles at about 1800 degrees Fahrenheit; though if highly toxic wastes are used, the afterburner temperature may be raised to around 2400 degrees Fahrenheit. As earlier stated, the off-gases or heat from the afterburner 6, in such case, may be used as at 6' to dry the incoming sludge into the dryer 4. As illustrated, non-contact drying is used so that the hot gases do not come in contact directly with the incoming sludge. The hot gases and water (entered into a venturi), are intermittently mixed and applied to a wet scrubber system 18. Since there is a potential of hexavalent chrome being generated in small quantities in the afterburner, a reducing chemical is fed to reduce any hexavalent chrome to the trivalent state. The final unit is a stack 10 which exhausts the clean effluent gases to the atmosphere.

Assuming the carbon-encapsulating conditions, later described, in the pyrolysis chamber 8, at the bottom of FIG. 1 there is shown the ash removal system embodying an ash-cooling conveyor 12 having an airtight connection between the furnace 8 and the ultimate truck T going to the landfill. The ash is thereby watercooled to reduce the temperature of the material from 900 degrees Fahrenheit to somewhere below 250 degrees Fahrenheit at which exposure to the air cannot result in combustion.

Returning, now, to the features of the process necessary to obtain its novel results, underlying the invention is the discovery that there is a criticality to the pyrolyzing or heating process in the absence of oxygen in the furnace 8 that brings the process to a point where the carbon-containing material in the sludge or the like, becomes bonded to and encapsulated with the dangerous heavy metal content.

Figure 2:
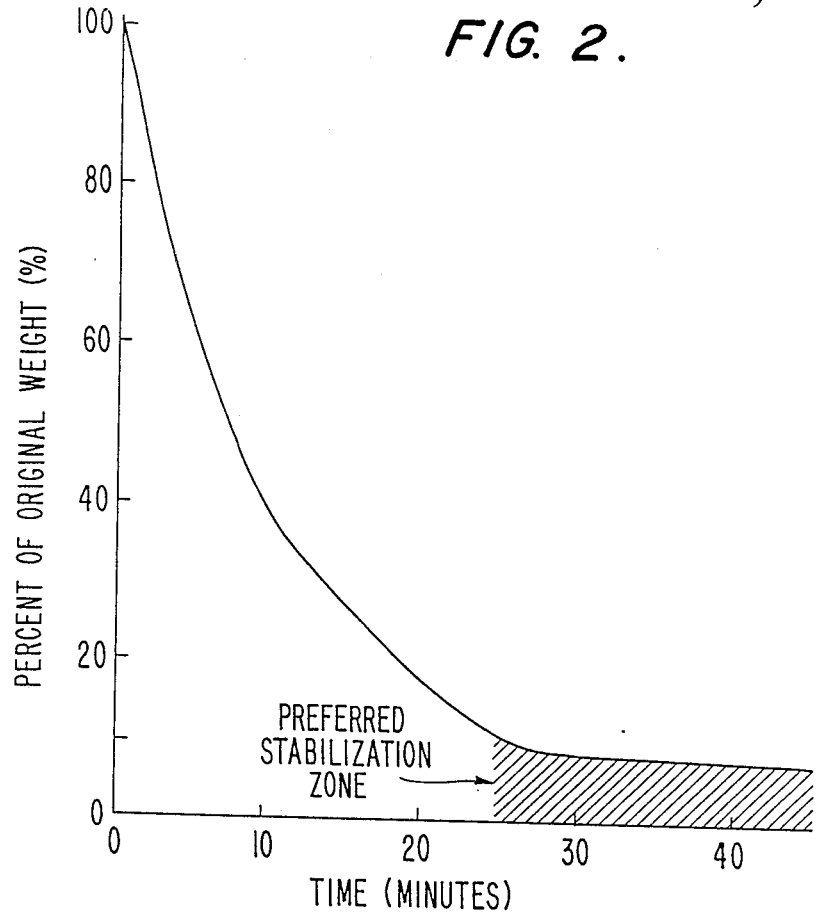
FIG. 2 is a graph illustrating the critical zone of operation required for the novel results of the invention.

This has been discovered to reside in the region where substantially all the volatile organics and solvents in the original sludge have been driven off at 6" in the substantially oxygen-free atmosphere, whereby the resulting char residue is at a point of substantially minimum weight. This minimum weight region is shown at the shaded region "Preferred Stabilization Zone" of the graph of FIG. 2, plotting percent of original weight of the sludge applied at 4' along the ordinate as a function of time of pyrolysis plotted along the abscissa in minutes for the approximate 900° F. of the above example. In this test it took about 24 minutes to pyrolize the carbon-coated material to its minimum weight of about 8–9%. This is as distinguished from operation on the left-hand steep curve regions of prior art metal recovery, as contrasted from the fixing result of the present invention.

At such a time, the char residue, again in the absence of air, is cooled down at 12 to a temperature where it will not ignite if exposed to air (about 250° F. or less).

Thereafter, cooling continues to ambient temperature. Under such conditions, it is found that the carbon is bonded or fixed to the heavy metal residue in a state where it is substantially non-leachable and where is it readily usable with safety for such purposes as landfill and the like. To prevent dusting, water may be added in the utilization of the residue product and/or it may be encapsulated in cement or the like for producing fireproof materials, as before explained. Alternatively, silicate and clay-type materials may be added to the sludge to result in a non-dusting cooled residue.

It is important, however, that there be sufficient carbon material in intimate contact in the sludge or other material to enable this complete bonding, encapsulation, fixing and stabilizing of the heavy metals in the residue, and this may be provided in solid form or from sludges and liquids. Hydrocarbon solvents may be added to the solid materials, as well.

The following Table 1 presents experimentally obtained results for the above-described industrial sludge, demonstrating the insignificant leaching of heavy metal residual contents by EPA's Leaching Test procedure (center column in mg/L) in the char residue produced by the process of the invention, as compared with the allowable (and much greater) EPA limits.

TABLE 1

CHEMICAL CHARACTERISTICS OF INVENTION RESIDUES

| METAL | BULK ASSAY CHAR RESIDUE (mg/L) | EPA ACTUAL LEACHATE* (mg/L) | MAXIMUM EPA LEACHATE (mg/L) |
|---|---|---|---|
| ARSENIC |  | <0.05 | 5 |
| BARIUM | 1,633 | 20 | 100 |
| CADMIUM | 42 | 0.08 | 1 |
| CHROMIUM | 2,366 | 0.04 | 5 |
| LEAD | 200 | 0.48 | 5 |
| MERCURY | 0.23 | <0.002 | 0.2 |
| SELENIUM |  | <0.1 | 1.0 |
| SILVER | 3.63 | <0.005 | 5 |

NOTE:
*EPA's Extraction Procedure Test Results.

As another example, Table 2 shows similar substantially non-leachable or fixed conditions in a residue prepared by the above process from a second POTW sludge with a high percentage of industrial contribution:

TABLE 2

| METAL | BULK ASSAY SLUDGE SOLIDS mg/kgm DRY WEIGHT | INVENTION CHAR RESIDUE mg/L | MAXIMUM EPA LIMITS mg/L |
|---|---|---|---|
| ARSENIC | 8 | <0.01 | 5 |
| BARIUM | 1,030 | 20 | 100 |
| CADMIUM | 309 | 0.27 | 1 |
| CHROMIUM | 1,490 | 0.04 | 5 |
| LEAD | 126 | 0.48 | 5 |
| MERCURY | 0.1 | <0.002 | 0.2 |
| SELENIUM | <0.7 | 0.011 | 1 |
| SILVER | 28 | <0.005 | 5 |
| NICKEL | 910 | 2.2 |  |
| ZINC | 2,210 | 1.0 |  |
| COPPER | 4,400 | 1.3 |  |

Cost comparisons using waste water treatment plant dewatered sludge, moreover, indicate that the present invention, with residue disposal, costs from $30 to $40 per ton; landfill, about $50 to $60 per ton, and compost (assuming adequate controls on the concentration of toxic industrial waste contamination), about $35 to $45, after deducting the value of the compost.

As still a further example of the efficacy of the invention, Table 3 presents the percent fixation achievable by the process of the invention on a sample of treated wet inorganic sludge (chromium hydroxide) at 19% Cr on a dry solids basis:

TABLE 3

PERCENT FIXATION OF TOTAL METAL IN RESIDUE

| PARAMETER | EP TOXICITY EXTRACTION | 1 M SULFURIC ACID EXTRACTION |
|---|---|---|
| pH | 5.0 | <0.5 |
| Cr, mg/l | 0.01 | 64 |
| Fixation, % | 99.9999 | 99.5 |

A further test of the efficacy of the process underlying the invention was made on both organic and inorganic sludges (Cr(OH)$_3$) and the latter both in the presence of insufficient carbon for adequate intimate admixing with the heavy metal sludge to effect the total fixing results of the invention (as when so moist as to cause a degree of decarbonization) and in the presence of sufficient carbon, adequately contacted and intermixed, under EPA Extraction Procedure (0.5N Acetic Acid at pH 5) and under severe 1 Molar sulfuric acid extraction or leaching (20 times the gram weight):

|  | Total Chromium In Leachate (mg/L) EP Leach | Severe Sulfuric Acid Treated with 1 M Solution |
|---|---|---|
| Sample A (Wet inorganic-adequate hydrocarbon solvent | 0.01 (99.99% fixation) | 64 (99.5% fixation) |
| Sample B (Wet inorganic with insufficient carbon) | 0.065 | 1300 |
| Sample C (Dry inorganic) | 0.22 | 140 |
| Sample D (Dry organic) | <0.005 | 72 |

These results again illustrate the importance of a sufficient carbon source, either already present in the organic material (tanning and other industrial wastes, gasoline-contaminated soil, sewage, and other toxic wastes) or added to intimately mix with the metal-containing sludge (such as added carbonaceous fuel, diesel, gas, coal, etc,) to establish the results of the invention. In some cases, moreover, it is preferable not to dry the residue to the almost dry (>95%, for example) state used in heavy metal recovery techniques, as for recovering chromium from char ash; but rather, to limit the drying to keep sufficient moisture (such as in the 65% solids earlier described, as an illustration) to insure the intimate and adequate encasing of the metal-containing sludge or ash or the like for the fixation purposes of the invention. The invention also is a one-step process as further distinguished from the antithetical recovery systems involving first oxidation and then reduction.

Figure 3:
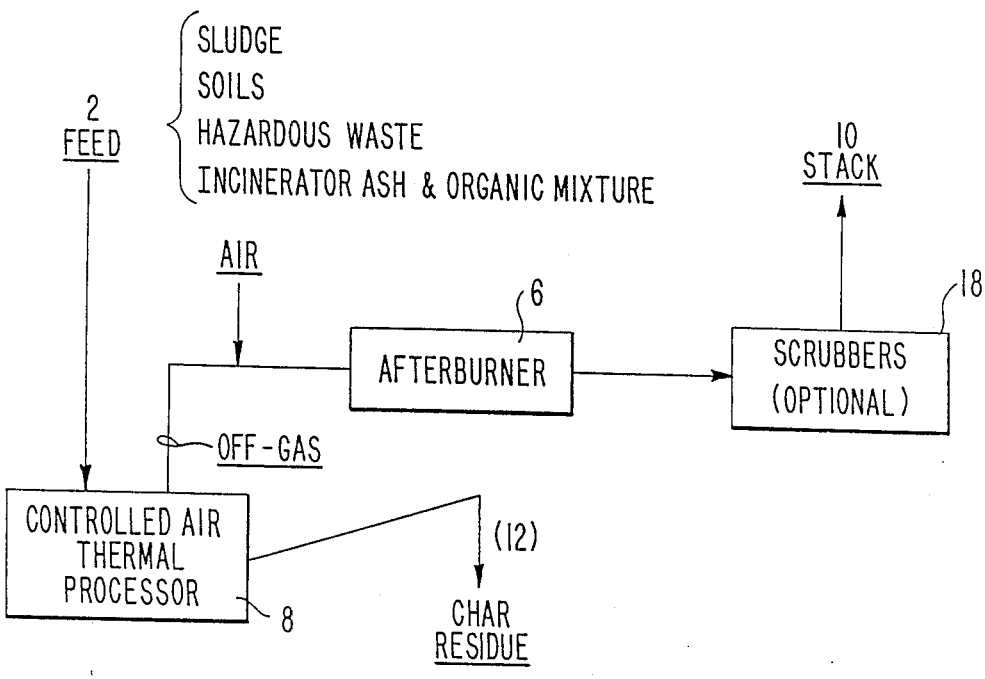
FIG. 3 is a flow diagram similar to FIG. 1 and FIG. 4 adds predrying steps.
Figure 4:
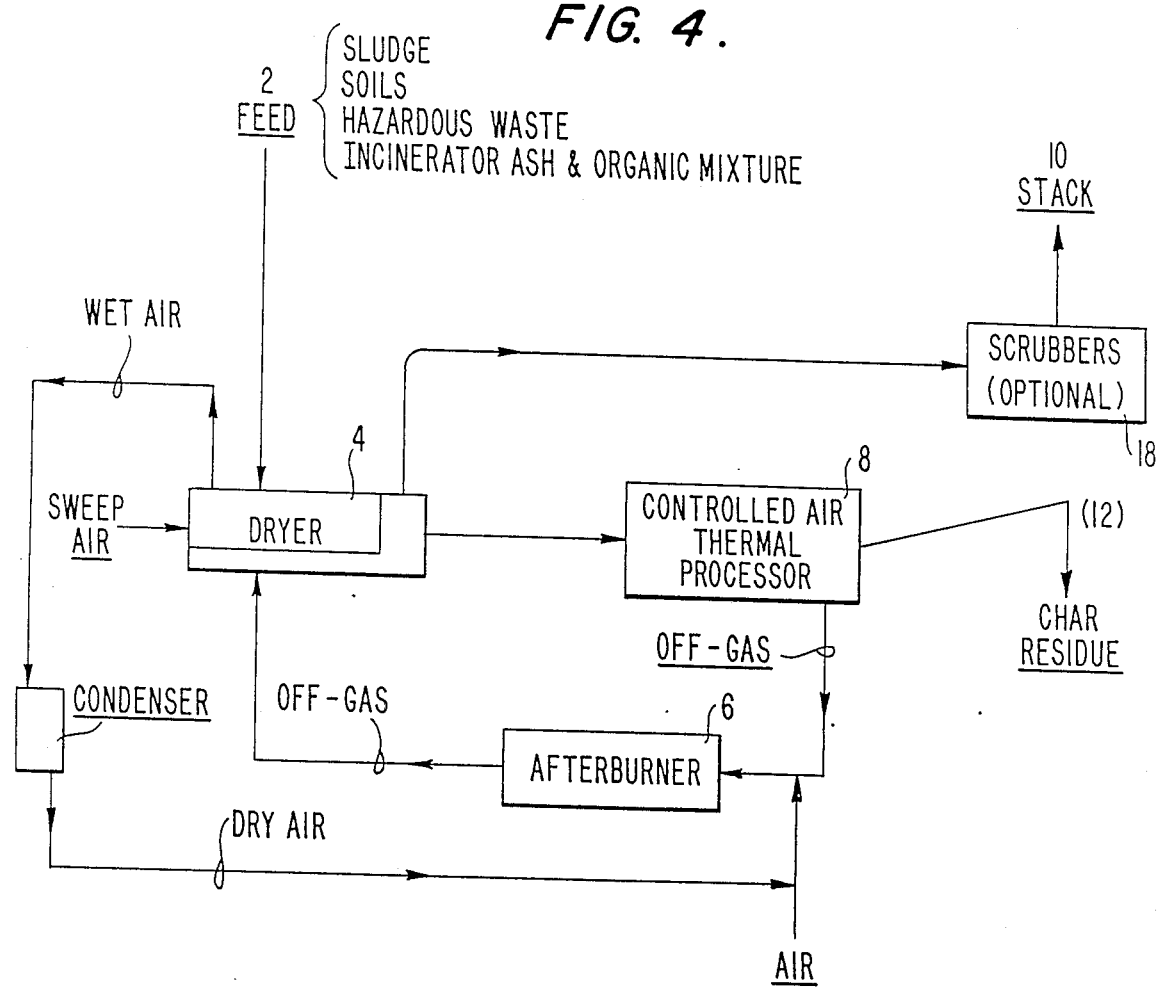

Turning, now, to the process flow diagram of FIG. 3 that summarizes the system of FIG. 1, the organic feed fuel (municipal sludge, soils, hazardous waste, incineration ash and organic mixture, etc. before discussed) is shown directly pyrolized under the critical conditions of FIG. 2, before discussed, in the controlled-air thermo-processor furnace 8, with off-gas generation for the afterburner 6, mixed with incoming air for combustion in the afterburner 6, and with the air-stream sent to scrubbers 18. The metal-fixed non-toxic char residue from the processor 8 is discharged after cooling in the manner 12 of FIG. 1. In FIG. 4, the organic feed system of FIG. 3 is shown employing a pre-drying step as in FIG. 1 in which the sludge is fed to the dryer 4 before reaching the processor furnace 8, with the previously described off gases from the afterburner 6 sent for non-contact drying as in FIG. 1. Wet air from the drier 4 is shown condensed to supply dry air for mixing with the processor off-gases.

Figure 5:
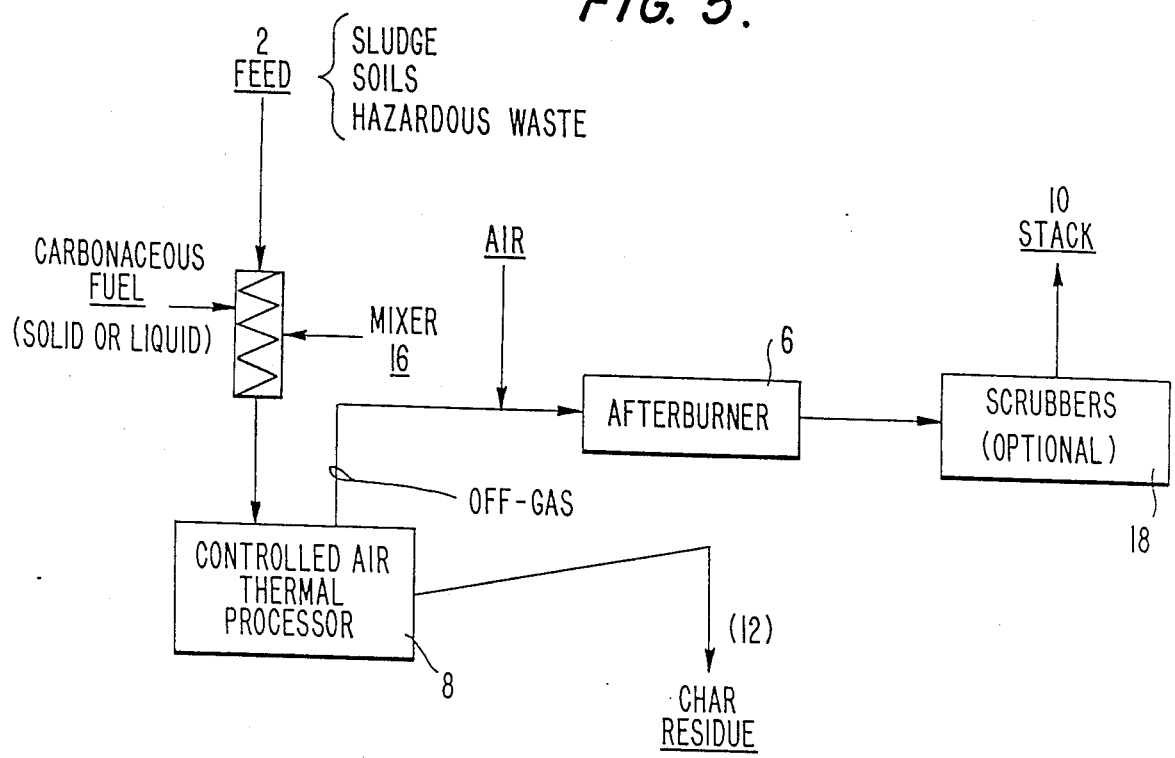
FIGS. 5 and 6 are similar diagrams of the process adapted for non-organic feed with externally applied carboneous fuel, and FIGS. 7 and 8 add drying steps.

A further option, as before discussed, is to handle non-organic sludge, soil and hazardous waste, as diagrammed in the flow process of FIG. 5. In such a system there is opportunity to mix this feed material at 16 with a hydrocarbon fuel (liquid or solid) first to provide a direct mixing contact of the carbonless feed with a sufficient amount of carbon for achieving the fixation process of the invention. These soils can also be used as feed stuff as well as any hazardous waste that may be necessarily required to be detoxified. If the mixing at 16 involves solids, various configurations, such as a pug mill, may be used for the solid/solid intimate mixing. Again, the thermo-processor off-gases, mixed with air, are applied to the afterburner 6 as in FIG. 3, and the stream goes to scrubbing for emission control at the stack 10, and with the fixed char residue discharging to the ambient air after cooling at 12.

Figure 6:
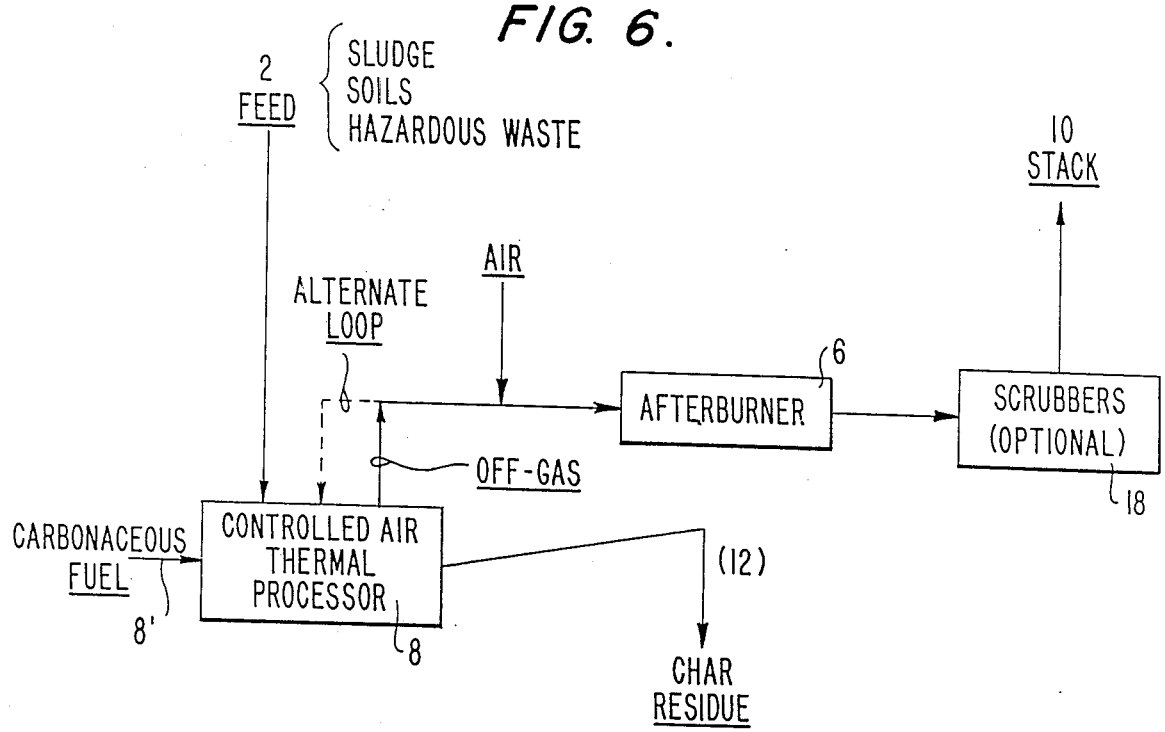

In the modified flow diagram of FIG. 6, on the other-hand, also involving non-organic feed material, the same is fired with carbonaceous fuel but, in this case, a gaseous or a liquid fuel is added directly at 8' to the process furnace 8. Since the processing of the invention at 8 is under starved air pyrolysis conditions, it presents an option of having the feed material intimately joined with the available carbon in a gaseous state during thermo-fixation; and it would be used, in such cases, where the nature of the feed material would allow for a gaseous carbon source that would generate a char residue demonstrating the fixation properties of the invention.

Figure 7:
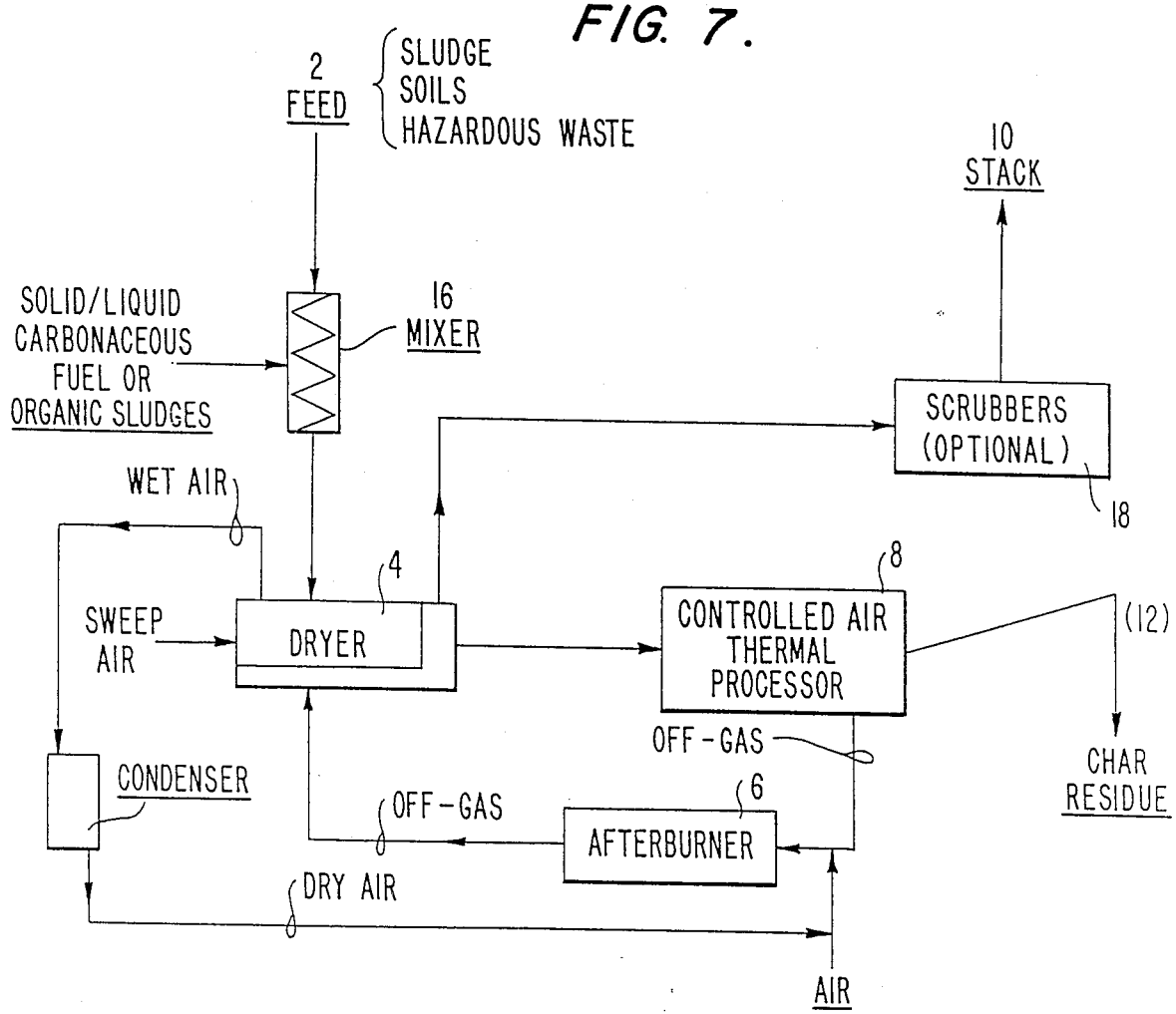
Figure 8:
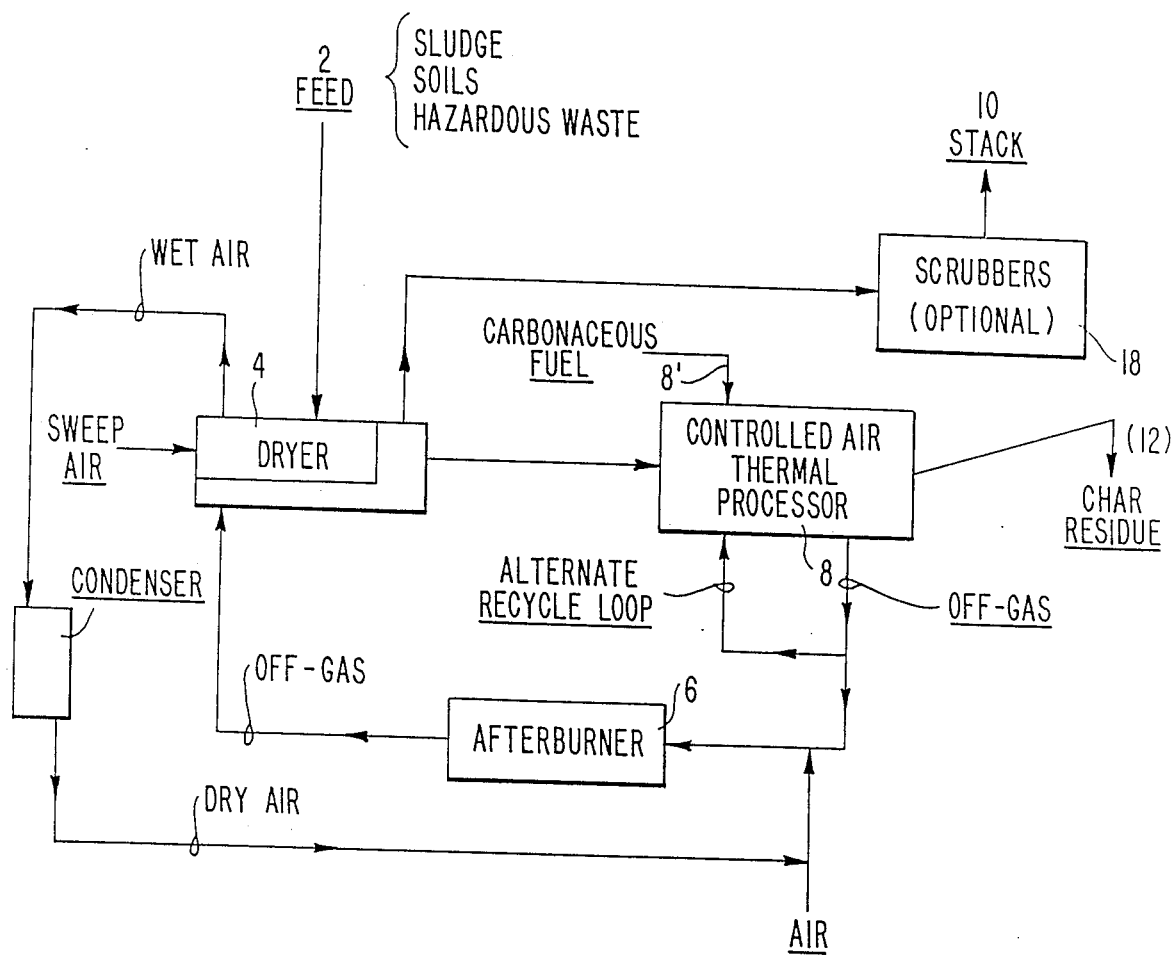

The system of FIG. 7 combines the pre-drying of FIG. 4 with the mixing (16) of non-organic feed material with carbonous fuel of FIG. 6. In the modification of FIG. 8, on the other hand, the pre-drying (4) of FIG. 7 is combined with the application of carbonaceous fuel at 8' into the processor pyrolysis furnace 8 of FIG. 6.

As before mentioned, the dried metal-fixed char residue cooled at 12 and ultimately at ambient temperature, may have water added to prevent dusting, or may be encapsulated in cement, or, indeed, silicate and clay-type materials may have been added to prevent an ultimate product that can dust.

Further modifications will also occur to those skilled in this art, and such are considered to fall within the spirit and scope of the invention as defined in the appended claims.

What is claimed is:

1. Apparatus for fixing and stabilizing heavy metals in a metal-containing sludge, soil, or ash feed material and the like, having, in combination, pyrolyzer means operable with a substantially oxygen-free internal environment; means for feeding the metal-containing material containing intimately contacting carbon-containing material to the pyrolyzer means; means for adjusting the pyrolyzer means to heat said metal-containing material in said substantially oxygen-free environment to a temperature sufficient to drive off volatile organics and solvents but below the temperatures for complete volatilization of most heavy metals and while inhibiting the formation of oxides of nitrogen and sulfur; means for continuing said heating for a period of time sufficient to produce a char residue with carbon bonded to the metal, until the weight of the residue expressed as a percentage of the weight of the metal-containing material is a minimum, and until substantially all volatile organics and solvents are driven off; means for cooling the said char residue in the absence of air to a temperature low enough to ensure that the residue will no longer combust if exposed to air; and means for thereafter enabling cooling the residue further to ambient temperature to provide a non-leachable residue.

2. Apparatus as claimed in claim 1 and in which dryer means is provided for at least partially pre-drying and metal containing material before feeding the same to the pyrolyzer means.

3. Apparatus as claimed in claim 1 and in which means is provided for mixing carbon-source material with the metal-containing material prior to heating in said pyrolyzer means.

4. Apparatus as claimed in claim 2 and in which afterburner means is provided for oxidizing further the volatiles driven off and further heating the metal-containing material in said dryer means.

* * * * *